Nov. 22, 1927.
P. BALLETTO
SEPARATOR
Filed Jan. 29, 1926
1,650,480
Fig. 1.
Fig. 2.
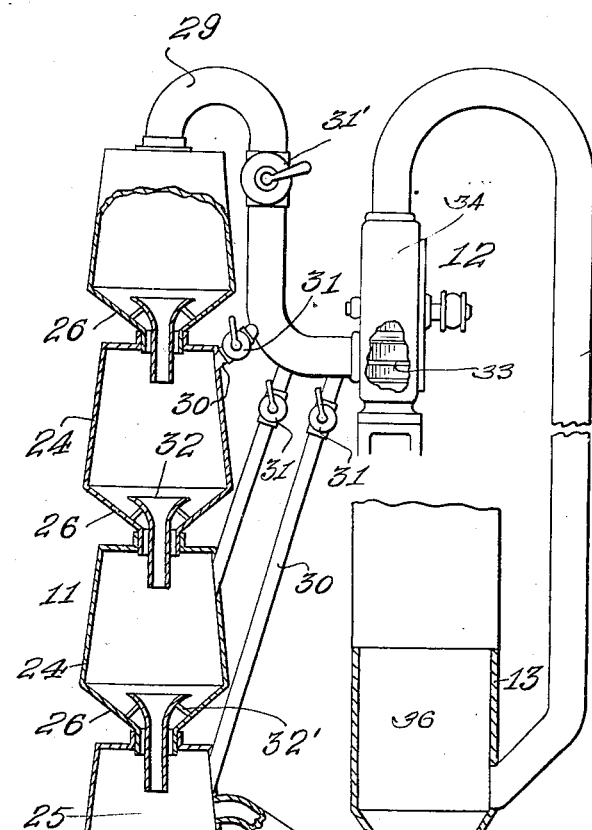
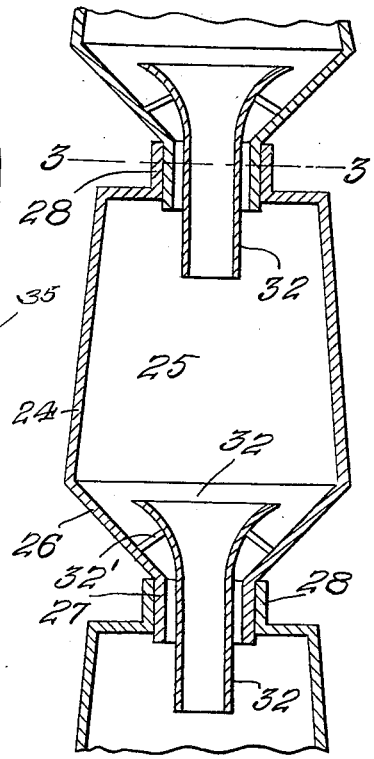
Fig. 3.
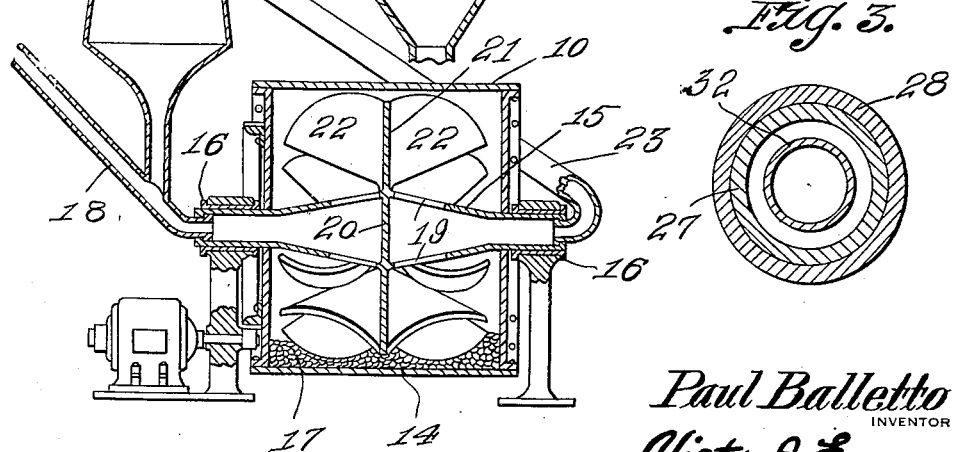
Paul Balletto
INVENTOR
BY Victor J. Evans
ATTORNEY Patented Nov. 22, 1927.

1,650,480

UNITED STATES PATENT OFFICE.

PAUL BALLETTO, OF LONG ISLAND CITY, NEW YORK.

SEPARATOR.

Application filed January 29, 1926. Serial No. 84,713.

This invention relates to improvements in separators, and is especially adapted for separating particles of different specific gravities.

Some of the objects of the invention are:—to employ a separator in connection with a triturator which embodies a series of separating elements operable under the influence of an air draft for the separation of the comparatively heavy weight particles from the comparatively light weight particles during the triturating process in the obtainment of an impalpable product; to employ separating elements as mentioned which are detachably connected, one above the other, so that any preferred number may be used to obtain the desired trituration; to selectively exhaust or withdraw particles of the desired density; and with these and other objects in view, the invention resides in the combination and arrangement of parts hereinafter fully described and illustrated in the accompanying drawing, in which:—

Figure 1 is a diagrammatic view of a triturating apparatus with my invention arranged therein.

Figure 2 is an enlarged vertical sectional view of one of the separating elements.

Figure 3 is a horizontal sectional view on the line 3—3 of Figure 2.

Referring more particularly to the drawing, it will be seen that I have shown my invention arranged in connection with a triturating means 10 to which the material to be triturated is fed, my improved separating means being shown in its entirety at 11 and which operates in conjunction with the means 10 and with an air draft inducing means 12, and discharging means 13.

The triturating means 10 may be of any suitable construction but I have shown a specific type of triturator and on which a separate application for Letters-Patent bearing Sr. No. 84,712 was filed January 29, 1926. The triturating means comprises a drum 14 through which extends, axially thereof, a hollow member 15 of the nature of a shaft whose opposite ends are journalled in bearings 16, so that the drum may be rotated by any suitable means. Pebbles 17 are contained within the drum 14 which serve to break up the lump material as it is fed into the drum. Material such as gum or resin is fed into the drum 14 by virtue of a feed pipe 18 connected to one end of the member 15 and which member 15 tapers in an opposite direction and is divided centrally by a partition 20. The member is provided with a series of openings or elongated holes 19 on opposite sides of the partition. The member 15 carries radially arranged blades 21 which have one of their edges provided with oppositely disposed curved wings 22, which blades rotate with the drum and pick up the mass and carry the same to a point in the revolution of the blades where the mass automatically slides down the blades and gravitates to the bottom of the drum where it is again picked up by the blades until thoroughly pulverized. As the mass is lifted and dropped, the pebbles serve to break up the lumps into small particles which pass to the separating means 11 by virtue of the draft of suction action which is created by the means 12. To the end of the hollow member opposite that to which the feed pipe is connected, I connect one end of a pipe 23, while the other end of the pipe is connected to one of the shells or elements of the means 11, now to be described.

The separating means 11 comprises a series of elements 24 which are interconnected and serve to separate the comparatively heavy weight particles from the comparatively light weight particles as they are virtually lifted out of the drum by the suction of the means 12. Each of the elements 24 is identical in construction and comprises a shell 25 having a hopper bottom 26 and a neck 27 at one end. The top of each shell is provided with a collar or neck 28 which is slightly larger in circumference than the neck 27 to permit the elements to be connected together, one above the other by fitting the neck 27 of one element within the neck 28 of the next adjacent element. The neck of the lowermost shell is connected to the feed pipe 18, whereas the uppermost shell is connected to the air draft inducing means 12 by a pipe 29 which enters the top of said shell centrally thereof. Each of the other shells are respectively connected to the pipe 29 by means of pipes 30 and which pipes 30 may be selectively shut off from the communication with the air draft by valves 31. The draft or suction to the uppermost shell is controlled by a valve 31' arranged in the pipe 29. As connected, the shells 25 define a continuous passage which is in communication with the interior of the drum through the feed pipe 18, and also through the pipe 23 when the valve 31' is turned on and the valves 31 shut off. Supported from the bottom 26 of the lowermost shell, is a tubular flared member 32, and it will be noted that these members 32 are in the line of draft, or in other words, they are in the passage defined by the shells 25. The attenuated portion of each of the members 32 is disposed in the reduced portions of the passage formed by the necks 27, but spaced therefrom by posts 32' or the like, so that the particles of relatively heavy density may gravitate therethrough and find their way back to the drum 14. It will now be manifest that as the particles of material are lifted from the drum, the comparatively heavy weight particles will in time fall under the action of gravity back to the feed pipe 18 in accordance with the degree of draft or suction action. By connecting the respective shells with the main suction pipe 29, it will be seen that upon the opening of the various valves 31, the particles of the selected density may be removed. In other words, if it is desired to remove relatively coarse particles, the pipe leading to the lowermost shell 25 is opened and the remainder of the valves closed so that the suction from the pipe 29 will draw the particles direct from this particular shell and prevent them from passing to the shells arranged above. Should it be desired to remove particles of very low density, or in case resin is being crushed within the triturator and it is desired to only exhaust these particles in powdered form, the valves 31 are all closed with the exception of the valve 31' arranged within the pipe 29. It will be seen that the draft will be induced through all of the shells 25 and as the particles rise, those of a heavy density will drop by reason of the action of gravity while the particles in powdered form will pass to the uppermost shell 25 and out through the pipe 29.

The air draft inducing means 12 includes a blade wheel 33 which is of the usual well-known construction and sucks at one side and blows out at the opposite side. The casing 34 of the blade wheel has one end of the pipe 29 connected thereto at the suction side, while one end of a pipe 35 is connected to the blow side of the blade wheel. The opposite end of the pipe 35 is connected to a funnel 36 from which the product is discharged into a suitable receptacle.

From the foregoing description, it will be seen that the lump material is first disintegrated and sucked into the separator by a draft of air, and the suction within the separator lifts the particles so that those particles of the proper fineness continue to pass through the respective shells until they are discharged, but those which are not of the proper fineness, will become separated from those particles of the proper fineness by the action of the elements 24, that is, the heavy particles will spread when entering the elements 24 through the members 32 or between the members 32 and the necks 27 and will drop to the inclined bottom 26 to return to the grinder. However, certain of the fine particles adhere to the larger particles but during the sliding of the same down the inclined bottom, the inrush of air between the member 32 and the neck causes the fine particles to break loose from the larger ones and travel upward. The flared member 32 deflects the air in the direction of the inclined walls and causes a restricted passage to form between the member and the reduced neck, as the flared member catches the major portion of the heavier particles which tend to prevent air from passing therethrough, thus increasing the air pressure between the flared member and the adjacent neck.

While I have described what I deem to be the most desirable embodiment of my invention, it is obvious that many of the details may be varied without in any way departing from the spirit of my invention, and I do not limit myself to the exact details of construction herein set forth nor to anything less than the whole of my invention limited only by the appended claims.

What is claimed as new is:—

1. A separator comprising a plurality of detachably connected superposed shells each of which has a hopper bottom and all of which constitute a passage, a main suction pipe leading to the top of the uppermost shell centrally thereof to create a suction through all of said shells, a valve for controlling the suction through said main suction pipe, pipes connecting the respective shells with said main suction pipe, and a control valve in each of the last mentioned pipes for selectively establishing and disestablishing communication between said main suction pipe and the respective shells.

2. A separator comprising a plurality of shell members arranged one above the other for the passage of the material to be separated, suction means for lifting the material through said shell members for exhausting the same therefrom, said means including a main suction pipe entering the uppermost shell member, pipes connecting the main suction pipe with the other respective shell members, and control means for the respective pipes for selectively establishing communication between said main suction pipe and the respective shell members for discharging the separated material of different densities.

In testimony whereof I have affixed my signature.

PAUL BALLETTO.